United States Patent [19]

Teramachi

[11] Patent Number: 4,489,990
[45] Date of Patent: Dec. 25, 1984

[54] RECIRCULATING-BALL LINEAR BEARING ASSEMBLY WITH A PAIR OF OPPOSED GUIDE RAILS

[76] Inventor: Hiroshi Teramachi, 2-34-8, Higashi-Tamagawa, Setagaya-Ku, Tokyo, Japan

[21] Appl. No.: 484,423

[22] Filed: Apr. 12, 1983

[30] Foreign Application Priority Data

Apr. 16, 1982 [JP] Japan .................................. 57-63533

[51] Int. Cl.³ .............................................. F16C 29/06
[52] U.S. Cl. ...................................................... 308/6 C
[58] Field of Search ....................... 308/6 C, 6 R, 6 A; 464/168

[56] References Cited

U.S. PATENT DOCUMENTS

| | | | |
|---|---|---|---|
| 3,920,289 | 11/1975 | Demay | 308/6 C |
| 4,363,526 | 12/1982 | Teramachi | 464/168 |
| 4,384,859 | 5/1983 | Teramachi | 308/6 C |
| 4,428,627 | 1/1984 | Teramachi | 308/6 C |

Primary Examiner—Lenard A. Footland
Attorney, Agent, or Firm—Kenyon & Kenyon

[57] ABSTRACT

A linear bearing assembly capable of withstanding the load acting thereon in all directions as it rolls along a pair of headed guide rails arranged parallel to each other, with one guide rail overlying the other and with their heads held opposite to each other. Each guide rail has two pairs of parallel ball raceways of arcuate cross section formed longitudinally on both sides of its head. Each pair of raceways are vertically spaced and angled away from each other. The linear bearing assembly includes a body of H-shaped cross section, having a web disposed between the guide rails and a pair of side flanges on the opposite sides thereof. The bearing body has formed thereon four pairs of ball raceways of arcuate cross section opposed to the four pairs of raceways on the guide rails. A ball return passageway extends longitudinally through the bearing body in the adjacency of each raceway thereon. Fastened to the opposite ends of the bearing body, a pair of end covers have formed therein hairpin grooves each intercommunicating one raceway on the bearing body and one adjacent return passageway therein to allow recirculation of a group of rolling antifriction balls. Cages guide the antifriction balls as they roll between the raceways on the bearing body and the raceways on the guide rails.

11 Claims, 19 Drawing Figures

RECIRCULATING-BALL LINEAR BEARING ASSEMBLY WITH A PAIR OF OPPOSED GUIDE RAILS

BACKGROUND OF THE INVENTION

This invention relates to linear bearing apparatus for use in moving an object along a rectilinear path with a minimum of friction. More specifically the invention pertains to the combination of a linear bearing assembly and a pair of opposed guide rails therefor, with the linear bearing assembly being of the type incorporating groups of recirculating antifriction balls. The recirculating-ball linear bearing apparatus in accordance with the invention finds particular utility in conjunction with industrial robots to be moved back and forth along rectilinear paths, among other applications.

Industrial robots are finding ever-increasing acceptance in various industries. They can not only increase productivity but also perform, with consistency beyond the physical capabilities of man, tasks that are too burdensome, monotonous, or dangerous for human operators. Among the functions commonly assigned to robots are: (1) the unloading of die-casting machines, quenching and delivering the castings to trim presses; (2) the welding of automobile frame parts; (3) the operating of forging presses; and (4) the loading and unloading of chucking machines. In some such functions the robots, or their articulated arms and hands, are required to travel back and forth along rectilinear paths. Linear bearings have been used for such travel of the robot arms because they can reduce frictional resistance to a minimum.

The current trend in robotized plants is toward higher productivity through an increase in the speed of the linear travel of the robot arms as they perform such functions as machine loading and unloading, and transferring and positioning of parts. Besides traveling at high speed, with frequent starts and stops, the robot arms as well as their hand assemblies make various degrees of free movement designed into them. Consequently the linear bearings carrying the robot arms must withstand the load acting thereon in every possible direction while allowing their frictionless linear movement.

SUMMARY OF THE INVENTION

The present invention provides improved recirculating-ball linear bearing apparatus of compact design capable of well withstanding the load acting thereon in any possible direction.

Basically the apparatus in accordance with the invention is a combination of a pair of guide rails and a recirculating-ball linear bearing assembly in rolling engagement therewith. Each having a head, the pair of guide rails are arranged in parallel spaced relation to each other, with their heads held opposite to each other. Each guide rail has two pairs of parallel spaced ball raceways of arcuate cross section formed longitudinally on both sides of its head. Each pair of ball raceways, on either side of the rail head, are angled away from each other.

The recirculating-ball linear bearing assembly, on the other hand, comprises a bearing body of approximately H-shaped cross section having a web lying between the pair of opposed guide rails and a pair of side flanges on both sides of the guide rails. The bearing body has four pairs of ball raceways of arcuate cross section formed longitudinally thereon in opposed relation to the four pairs of ball raceways on the guide rails, and ball return passageways extending longitudinally therethrough in the vicinities of the respective ball raceways thereon. Rigidly attached to the opposite ends of the bearing body, a pair of end covers have each formed therein hairpin grooves each intercommunicating one ball raceway on the bearing body and one adjacent ball return passageway therein. Thus are formed eight closed paths for the recirculation of respective groups of antifriction balls. The linear bearing assembly further includes cage means for guiding the groups of antifriction balls as they roll between the raceways on the guide rails and the raceways on the bearing body.

Preferably the ball raceways on the guide rails and on the bearing body are, as viewed cross-sectionally, each curved with a radius approximately equal to the radius of each antifriction ball. Further the planes passing the median lines of the two pairs of ball raceways on each guide rail and the centers of the antifriction balls thereon are at angles of approximately 90 degrees to each other. The planes passing the median lines of each two pairs of ball raceways on the bearing body, associated with the two pairs of ball raceways on one guide rail, and the centers of the antifriction balls thereon are also at angles of approximately 90 degrees to each other.

Thus the linear bearing assembly, typically with a robot arm mounted thereon, rolls along the pair of opposed guide rails via the eight groups of recirculating antifriction balls, with each ball group rollably confined between two opposed raceways on the bearing body and on one guide rail. The arrangement and angular orientations of the opposed ball raceways on the bearing body and guide rails are such that the bearing apparatus can withstand the load forces acting thereon in downward, upward, and opposite lateral directions equally well.

One of the features of the invention resides in the fact that the ball paths between bearing body and guide rails are each defined by two opposed circular arcs, as viewed cross-sectionally, each arc having a radius approximately equal to the radius of the antifriction balls rolling therebetween. Consequently the balls are firmly engaged between the opposed raceways against the possibility of slipping or spinning while being capable of smoothly rolling with the travel of the bearing body in either direction along the guide rails. Moreover, when heavily loaded, the balls are free to undergo elastic deformation, only to make contact with the raceways over greater areas, enabling the apparatus to positively support the load in the face of the varying directions of its action.

The above and other features and advantages of this invention and the manner of attaining them will become more apparent, and the invention itself will best be understood, from a study of the following description and appended claims, with reference had to the attached drawings.

DESCRIPTION OF THE PREFERRED EMBODIMENTS

General

Figure 1:
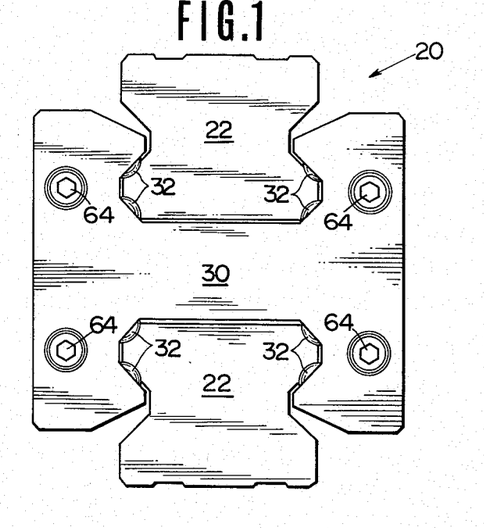
FIG. 1 is an end elevation of the recirculating-ball linear bearing apparatus constructed in accordance with the novel concepts of this invention.
Figure 2:
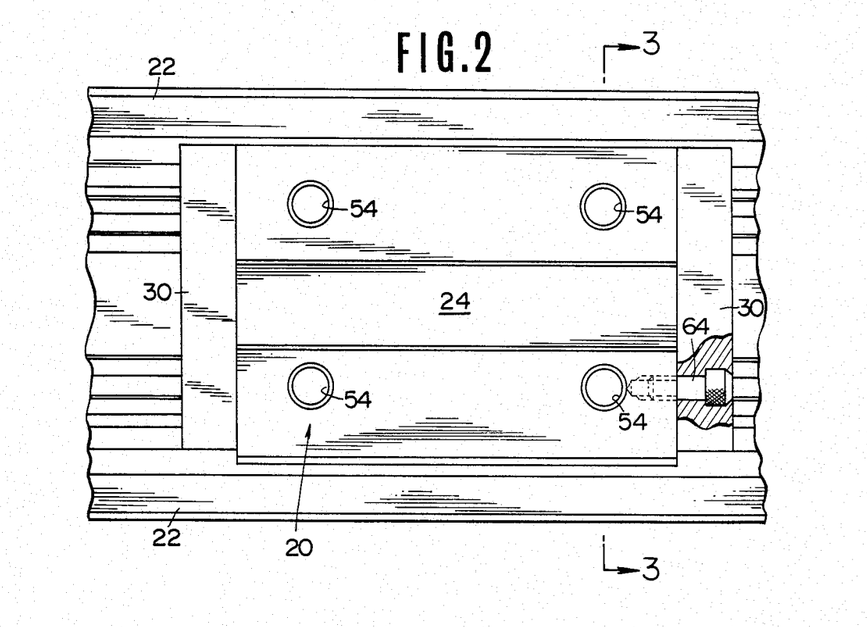
FIG. 2 is a side elevation of the apparatus of FIG. 1, with the pair of guide rails shown fragmentarily for illustrative convenience and with the linear bearing assembly shown partly broken away for clarity.
Figure 3:
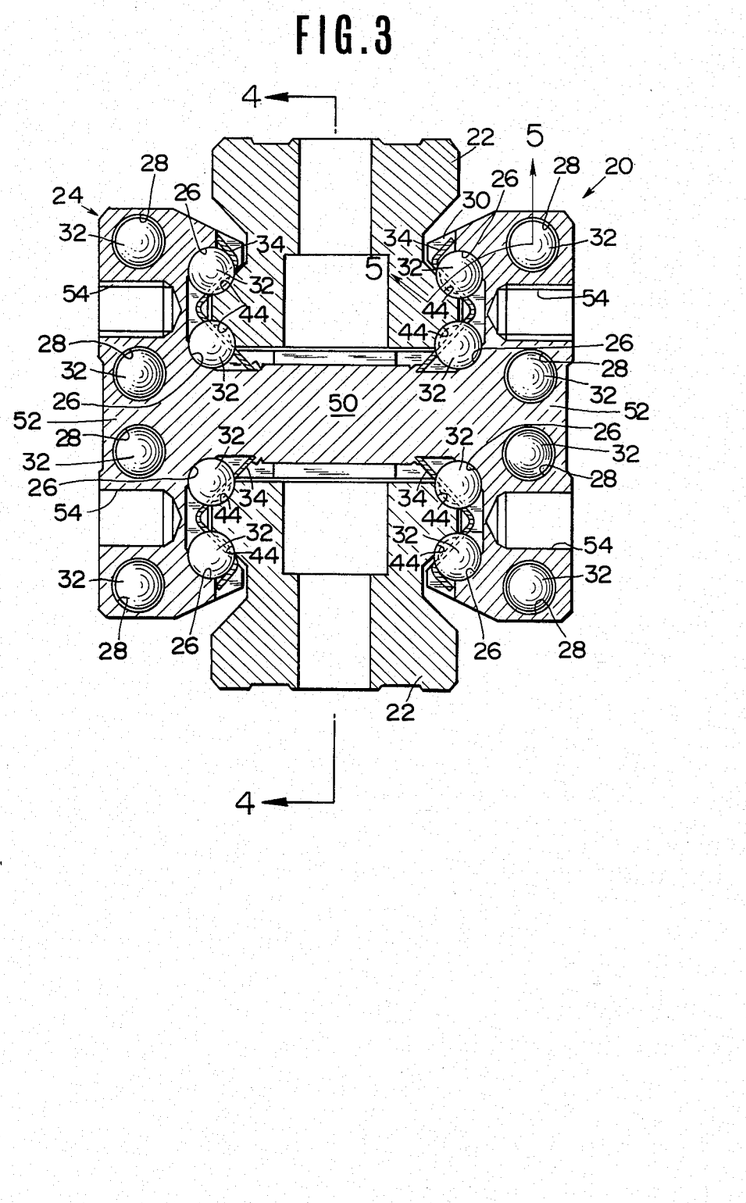
FIG. 3 is a section through the linear bearing apparatus, taken along the line 3—3 of FIG. 2.

The recirculating-ball linear bearing apparatus in accordance with the invention is, basically, the combination of a linear bearing assembly 20 and a pair of guide rails 22 shown in FIGS. 1 to 3 of the attached drawings. Positioned between the pair of guide rails 22, the linear bearing assembly 20 is to roll in either direction along the same. In the use of the apparatus the linear bearing assembly 20 is to be attached to a desired object to be moved linearly relative to the part to which the guide rails 22 are fastened.

FIGS. 1 to 15 illustrate the first preferred form of the recirculating-ball linear bearing apparatus. Reference is first directed to FIGS. 1 to 5 in order to briefly explain the general organization of the linear bearing assembly 20. Broadly the bearing assembly comprises:

1. A bearing body 24 substantially in the shape of an H in cross section having four pairs of ball raceways 26, FIG. 3, of arcuate cross section formed longitudinally on its inside surfaces, and four associated pairs of ball return passageways 28 extending longitudinally therethrough in the vicinities of, and parallel to, the respective pairs of raceways 26.

Figure 5:
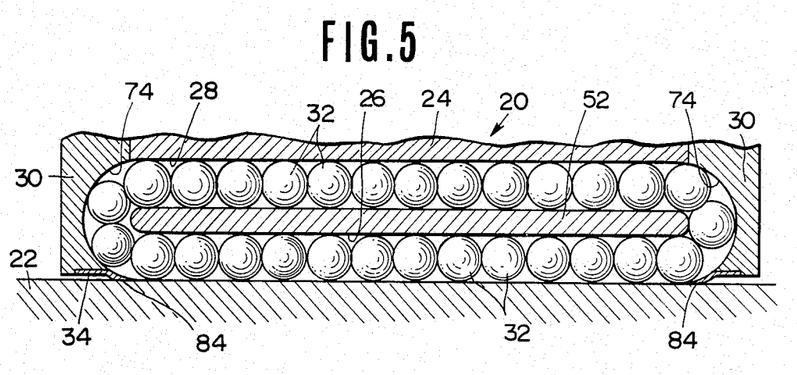
FIG. 5 is a section through the linear bearing assembly, taken along the line 5—5 of FIG. 3, the view showing in particular one of the closed ball paths in the bearing assembly for the recirculation of antifriction balls.

2. A pair of end covers 30, each of substantially the same shape and size as the cross section of the bearing body 24, screwed or otherwise fastened to the opposite ends of the bearing body and adapted to intercommunicate each ball raceway 26 on the bearing body and one adjacent ball return passageway 28 therein as best seen in FIG. 5.

3. Eight groups of rolling antifriction balls 32 capable of recirculating through the respective closed paths comprising the eight raceways 26 on the bearing body 24 and the eight return passageways 28 therein.

4. Two pairs of cages 34, FIGS. 3 to 5, each extending along one pair of ball raceways 26 on the bearing body 24 for rollably holding the antifriction balls 32 thereon in a manner allowing their rolling engagement with one of the guide rails 22.

It will have been seen that the linear bearing assembly 20, caught between the pair of guide rails 22, travels along the same via the eight groups of recirculating antifriction balls 32. The following, then, is the more detailed discussion, under the respective headings, of the guide rails 22 and of all but the antifriction balls 32 of the listed components of the linear bearing assembly 20. Such detailed discussion presupposes that the guide rails 22 are laid horizontally. This assumption is, however, for the convenience of description only; in practice, the guide rails may not necessarily be of horizontal disposition.

Guide Rails

Figure 6:
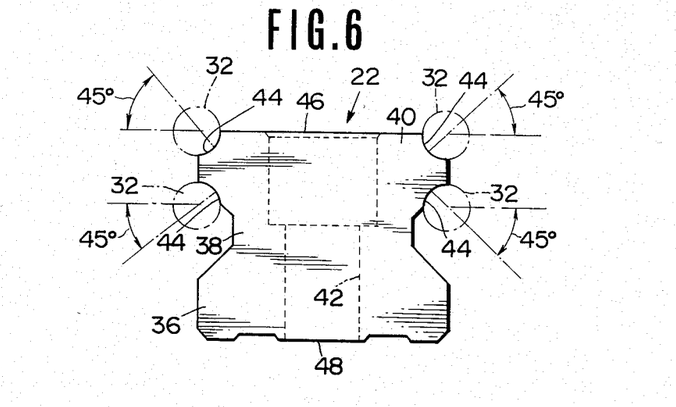
FIG. 6 is an end elevation of one of the pair of guide rails in the linear bearing apparatus of FIG. 1.

As shown by itself in FIG. 6, each of the pair of guide rails 22 is generally of the type commonly known as the T or I rail. It integrally comprises a flange base 36, an upstanding web 38 on the flange base, and a head 40 on the web. A plurality of counterbored mounting holes 42 are formed through each guide rail 22 at longitudinal spacings for the passage of fastener elements, not shown, in securing the guide rails to any desired part. As will be noted from FIGS. 1 to 3, the pair of guide rails 22 are arranged in parallel spaced relation to each other, with one overlying the other and with their heads 40 held opposite to each other.

In accordance with a feature of the invention, two pairs of ball raceways 44 are formed on both sides of the head 40 of each guide rail 22 so as to extend longitudinally thereof. These raceways are intended for relative rolling engagement with the respective groups of antifriction balls 32 on the raceways 26 on the bearing body 24. Each pair of ball raceways 44 on each guide rail extend in vertically spaced, parallel relation to each other. As viewed cross-sectionally, or in an end view as in FIG. 6, each ball raceway is curved with a radius approximately equal to that of each antifriction ball 32.

It will also be noted from FIG. 6 that each pair of ball raceways 44 on each guide rail 22 are oriented away from each other. Further the plane passing the longitudinal median line of each ball raceway 44 and the centers of the antifriction balls 32 properly seated thereon are at an angle of 45 degrees to the plane of the horizon, to which there are laid parallel the top 46 and bottom 48 surfaces of the guide rail as has been assumed above. To turn this statement around is to say that the planes passing the median lines of the four ball raceways 44 on each guide rail and the centers of the antifriction balls 32 thereon are angularly spaced 90 degrees from each other. The four pairs of ball raceways 26 on the bearing body 24 are directed opposite to the four pairs of ball raceways 44 on the two guide rails 22, as shown in FIG. 3 and as will be later explained in further detail. These angular orientations of the ball raceways on the guide rails and on the bearing body enable the complete linear bearing apparatus to most effectively bear the load acting thereon in all of upward, downward, rightward, and leftward directions as viewed in FIG. 1 or 3.

Bearing Body

Figure 4:
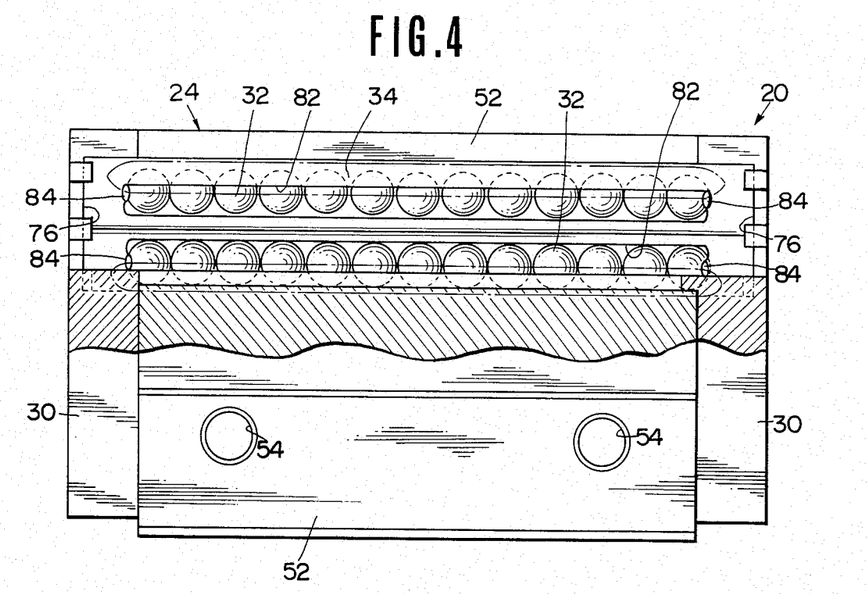
FIG. 4 shows the linear bearing assembly partly in section and partly in elevation, the section being taken along the line 4—4 of FIG. 3.
Figure 7:
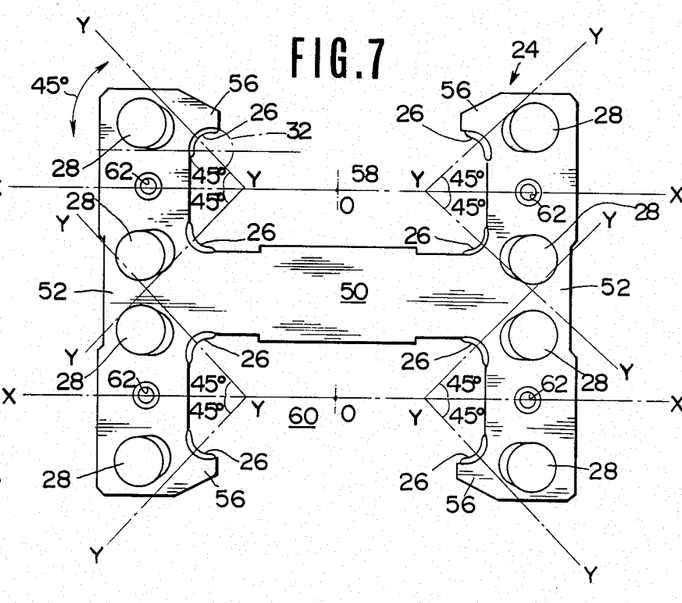
FIG. 7 is an end elevation of the bearing body in the linear bearing apparatus of FIG. 1.

The bearing body 24 appears in FIGS. 2 to 4, in part in FIG. 5, and by itself in FIG. 7. H-shaped in cross section, the bearing body 24 comprises a web 50 lying between the pair of guide rails 22 with clearances, and a pair of side flanges 52 on the opposite sides of the guide rails. Each side flange 52 has a plurality of tapped mounting holes 54 formed horizontally therein, as seen in FIGS. 2 to 4. These mounting holes are intended for use in attaching the bearing body to the object to be moved along the guide rails 22, by means of screws or like fastener elements threadedly engaged therein.

With particular reference to FIG. 7 the pair of side flanges 52 of the bearing body 24 are formed to include rims 56 directed inwardly from their upper and lower edges. The rims 56 extend throughout the length of the bearing body 24. The pair of rimmed side flanges 52 of the bearing body may be considered to bound in combination with the web 50 two generally rectangular spaces designated 58 and 60. Each two opposed pairs of ball raceways 26 are positioned at the four corners of one of the rectangular spaces 58 and 60. Thus each pair of ball raceways are vertically spaced from and parallel to each other. Also, like the ball raceways on the guide rails, each raceway 26 on the bearing body is curved with a radius approximately equal to that of each antifriction ball to roll thereon, as viewed cross-sectionally or in an end view as in FIG. 7.

It will also be observed from FIG. 7 that each two opposed pairs of ball raceways 26 on the bearing body are arranged in bilateral symmetry with respect to a horizontal plane X—X passing the geometric center 0 of one of the aforesaid spaces 58 and 60 defined by the bearing body. Further the planes Y—Y passing the longitudinal median lines of the ball raceways 26 and the centers of the antifriction balls 32 thereon are all at an angle of 45 degrees to the horizontal plane X—X, or at angles of 90 degrees to each other.

When the bearing body 24 is mounted between the pair of guide rails 22 via the antifriction balls 32, as best pictured in FIG. 3, the four pairs of ball raceways 26 on the bearing body lie opposite to the four pairs of ball raceways 44 on the guide rails. The eight groups of recirculating antifriction balls 32 travel in rolling contact with the raceways on the guide rails and with the raceways on the bearing body.

The foregoing will have made clear that each ball path between guide rails and bearing body is delineated by two opposed, concentric circular arcs, as viewed cross-sectionally, with a radius approximately equal to that of each antifriction ball. Consequently, on being loaded, the apparatus allows the antifriction balls to undergo elastic deformation and hence to make contact with the raceways 26 and 44 over greater areas. Such elastic deformation of the antifriction balls is desirable for the effective transmission of the load from bearing body to guide rails in the face of the varying directions of load action.

FIG. 7 also clearly reveals the placement of the four pairs of ball return passageways 28 extending longitudinally through the bearing body 24, or through its pair of side flanges 52. Each pair of ball return passageways 28 lie in positions of bilateral symmetry with respect to the horizontal plane X—X. While each pair of ball return passageways are more spaced from each other than are each pair of ball raceways 26 on the bearing body, nonetheless it will be seen that they are located inwardly of the planes Y—Y passing the median lines of the associated pair of ball raceways 26 and the centers of the antifriction balls 32 thereon. This arrangement makes it possible to correspondingly reduce the vertical dimension of the side flanges 52 and so to make the bearing body compact.

It should also be appreciated that the pair of side flanges 52 of the bearing body have each a very substantial thickness or transverse dimension. Thus, even though the four pairs of ball return passageways 28 are formed through the side flanges 52, they do not suffer any significant decrease in rigidity or strength. The great thickness of the side flanges serves to enhance their rigidity, preventing their outward deformation under load.

The antifriction balls 32 are not loaded while traversing the return passageways 28. The diameter of each ball return passageway is therefore made somewhat greater than that of each antifriction ball so that the balls may travel therethrough with minimal resistance.

Seen at 62 in FIG. 7 are four tapped holes in each end of the bearing body 24. These holes receive threaded fastener elements such as cap screws 64, FIGS. 1 and 2, by which the pair of end covers 30 are secured to the bearing body.

End Covers

While the pair of end covers 30 appear in FIGS. 1 to 4, FIGS. 8 to 11 more aptly reveal their organizations. Since both end covers are of identical make, only one of them will be described in detail, it being understood that the same description applies to the other.

Figure 8:
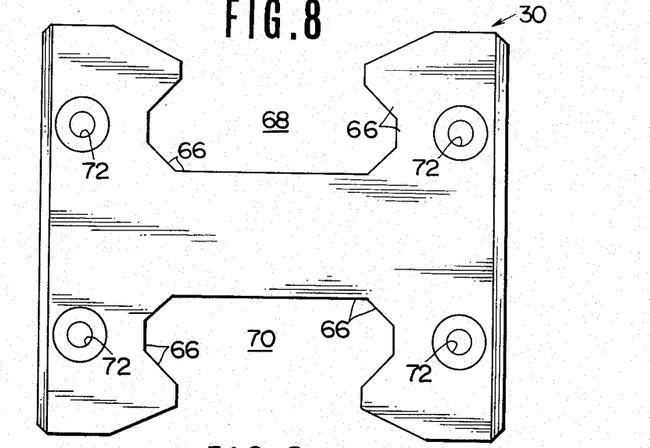
FIG. 8 is an elevation showing the outside surface of one of the pair of end covers in the linear bearing apparatus of FIG. 1.
Figure 9:
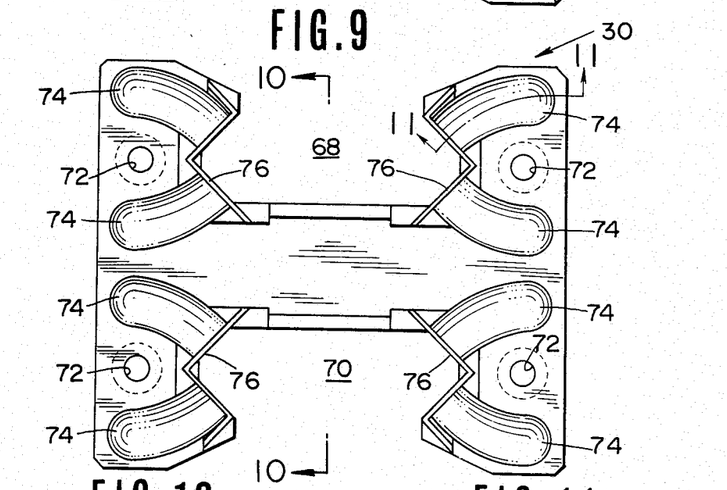
FIG. 9 is an elevation showing the inside surface of the end cover of FIG. 8.

FIG. 8 shows the outer surface of the representative end cover 30, and FIG. 9 its inner surface. It will be noted that the end cover is generally H-shaped, as is the bearing body. The H-shaped end cover is fabricated as by the injection molding of a rigid synthetic resin or by the die casting of metal. While the end cover is of approximately the same shape and size as the cross section or end faces of the bearing body 24, the inside edges 66 of the end cover closely correspond in shape to the heads 40 of the pair of opposed guide rails 22. The inside edges 66 bound two opposed spaces 68 and 70 for receiving the heads 40 of the guide rails with clearances. Four counterbored holes 72 in the end cover are intended to pass the screws 64, FIGS. 1 and 2, by which it is fastened to the bearing body 24.

The end cover 30 has four pairs of hairpin grooves 74 formed in its inner face which makes direct contact with one of the end faces of the bearing body 24. Each hairpin groove 74 intercommunicates one ball raceway 26 on the bearing body 24 and the adjacent one of the ball return passageway 28 therein in the manner best seen in FIG. 5.

Figure 11:
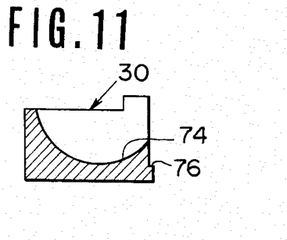
FIG. 11 is also a section through the end cover, taken along the line 11—11 of FIG. 9.
Figure 12:
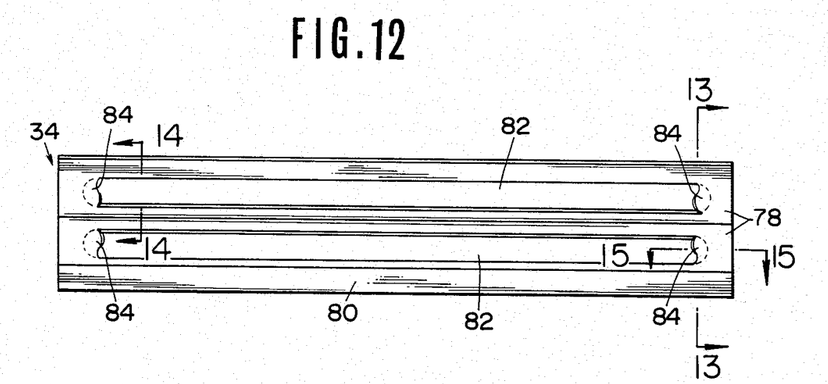
FIG. 12 is an elevation of one of the cages in the apparatus of FIG. 1.

The hairpin grooves 74 are curved not only in the plane of FIGS. 5 and 11 but also in a plane at right angles therewith, as in FIG. 9. As viewed in the latter figure, each pair of hairpin grooves are bilaterally symmetrical with respect to either of the horizontal planes X—X of FIG. 7 and are rather gently convexed away from each other. Each hairpin groove has its opposite ends in communication with one extremity of one ball raceway 26 on the bearing body 24 and with one extremity of one ball return passageway 36 in the bearing body, thus serving as a hairpin curve therebetween. The other extremities of the ball raceways and ball return passageway are of course likewise intercommunicated via similar hairpin grooves in the other end cover. Accordingly each ball raceway on the bearing body and one adjacent ball return passageway therein, in combination with two associated hairpin grooves in the end covers, make up in combination a closed path, as in FIG. 5, for the recirculation of one group of antifriction balls 32.

Figure 10:
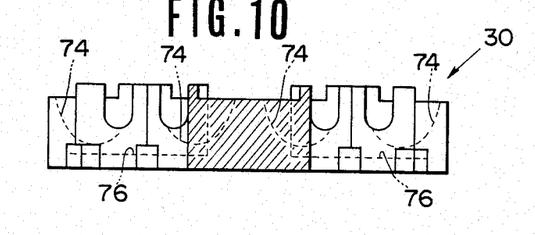
FIG. 10 is a section through the end cover, taken along the line 10—10 of FIG. 9.

As seen in both FIGS. 9 and 10, the representative end cover 30 has also two opposed pairs of retainer grooves 76 formed in its inner face. Intended to closely receive one of the opposite longitudinal ends of one of the cages 34, each retainer groove 76 has the exact cross sectional shape of each cage. The cross sectional shape of the cages is yet to be studied. The shape of each retainer groove will also become clear from the subsequent discussion of the cages. For the moment, therefore, suffice it to say that the retainer grooves 76 have portions extending across the respective pairs of hairpin grooves 74 at their ends lying next to the ball raceways on the bearing body.

FIG. 10 indicates that the retainer grooves 76 have a depth well over half the thickness of the end cover 30. The great depth of the retainer grooves is a requirement for firmly retaining the cages 34 in place on the pair of end covers or on the bearing body 24.

Cages

The cages 34 are seen in cross section in FIG. 3, in side elevation in FIG. 4, and in longitudinal section in FIG. 5. FIGS. 12 to 15, however, better illustrate the configuration of each cage. The four cages used in this embodiment are all of identical design, so that only one of them will be described in detail with reference to FIGS. 12 to 15, with the understanding that the same description applies to each of the other cages.

Figure 13:
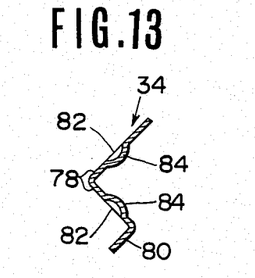
FIG. 13 is a cross section through the cage, taken along the line 13—13 of FIG. 12.
Figure 14:
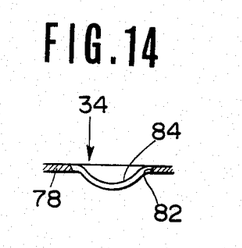
FIG. 14 is an enlarged, fragmentary cross section through the cage, taken along the line 14—14 of FIG. 12.
Figure 15:
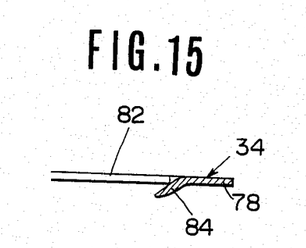
FIG. 15 is an enlarged, fragmentary longitudinal section through the cage, taken along the line 15—15 of FIG. 12.

Functioning to guide two groups of antifriction balls 32 as they roll between one pair of raceways 26 on the bearing body 24 and the opposed pair of raceways 44 on one guide rail 22, each cage is fabricated by pressing a strip of steel or like rigid material into the shape of a V in cross section to provide a pair of divergent web portions 78. Further, in the illustrated embodiment, the cage 34 is formed to include a flange 80 extending along one of its sides and bent approximately right-angularly therefrom. The flange serves to add rigidity to the cage. As a whole, therefore, the cage 34 is of approximately Z-shaped cross section as best seen in FIG. 13. It will be understood that another similar flange could be formed along the other side of the cage. In that case the cage would have a W-shaped cross section.

The Z-shaped cross section of the cage 34 corresponds to the shape of each retainer groove 76 in each end cover 30. The cage 34 is immovably supported just inwardly of one pair of ball raceways 26 on the bearing body 24 by having its opposite extremities pressfitted in two corresponding ones of the retainer grooves 76 in the pair of end covers 30, as clearly shown in FIGS. 4 and 5.

Each of the divergent web portions 78 of the cage 34 has a slot 82 formed longitudinally therein. Each slot 82 has a width appropriately less than the diameter of the antifriction balls 32. More specifically the width of each slot 82 must be such that, rolling along one of the raceways 26 on the bearing body 24, the antifriction balls 32 partly project inwardly through the slot into rolling engagement with the corresponding one of the raceways 44 on the guide rails 22.

The cage 34 is further formed to include a pair of tongues 84 at the opposite extremities of each slot 82. Each tongue 84 is bent away from the plane of the corresponding web portion 78 toward one of the guide rails 22, thereby forming an extension of one of the hairpin grooves 74 in the end covers 30, as best shown in FIG. 5. It will also be understood from this figure that the tongues 84 of the cage are intended to make possible the smooth transition of the antifriction balls 32 from the raceways on the bearing body to the hairpin grooves in the end covers.

Thus the four cages 34 with their tongues 84 perform the important function of guiding the antifriction balls along the raceways on the bearing body and to and from the hairpin grooves in the end covers. Their rigidity and strength must be sufficiently high for that function. The steel-made cages may therefore be hardened by a suitable heat treatment.

FIG. 3 best depicts the attitudes of the two pairs of cages 34 when they are mounted in position on the bearing body 24, with their opposite ends engaged in the Z-shaped retainer grooves in the pair of end covers. In these working positions the cages have the median lines of their slots contained in the planes Y—Y of FIG. 7. It will be appreciated that the assemblage of the linear bearing assembly 20 is greatly facilitated as the cages can be mounted in place merely by having their opposite ends fitted in the retainer grooves in the end covers. Also the Z- or W-shaped cages have extremely high rigidity and so makes it possible to extend the longitudinal dimension of the linear bearing assembly 20 practically to any required degree.

Operation

While the operation of the recirculating-ball linear bearing apparatus in accordance with the invention is believed to be largely apparent from the foregoing, further amplification will be made in the following brief summary of such operation. As the linear bearing assembly 20 travels in either direction along the pair of guide rails 22, the eight groups of antifriction balls 32 roll between the respective raceways 26 on the bearing body 24 and the respective opposed raceways 44 on the pair of guide rails 22 as guided by the two opposed pairs of cages 34. While thus rolling between bearing body and guide rails, the antifriction balls 32 bear the load on the bearing assembly against the guide rails and thus enables the bearing assembly to travel along the guide rails with a minimum of friction.

At the trailing end of the bearing assembly 20 the tongues 84 of the cages 34 direct the successive balls 32 into the hairpin grooves 74 in one of the end covers 30. The load on the bearing assembly is no longer transmitted to the balls as they flow into the hairpin grooves.

The non-load-bearing balls 32 subsequently enter the return passageways 28 in the bearing body 24 and travels therethrough in the same direction as the traveling direction of the bearing assembly relative to the guide rails. The travel of the non-load-bearing balls through the hairpin grooves and the return passageways takes place as the load-bearing balls between bearing body and guide rails push the non-load-bearing balls in endless rows. Passing the hairpin grooves 74 in the end cover at the leading end of the bearing assembly, the balls reenter the spaces between the raceways 26 on the bearing body and the raceways 44 on the guide rails to bear again the load on the bearing assembly.

Thus, during the travel of the linear bearing assembly 20 along the pair of guide rails 22, the eight groups of antifriction balls 32 constantly recirculate through the respective closed paths formed by the raceways 26 on the bearing body 24 and the raceways 44 on the guide rails 22, the hairpin grooves 74 in the end covers 30, and the return passageways 28 in the bearing body. The direction in which the balls roll along these closed paths is of course subject to change depending upon the traveling direction of the bearing assembly 20 along the guide rails 22.

Modes of Use

Figures 16, 17:
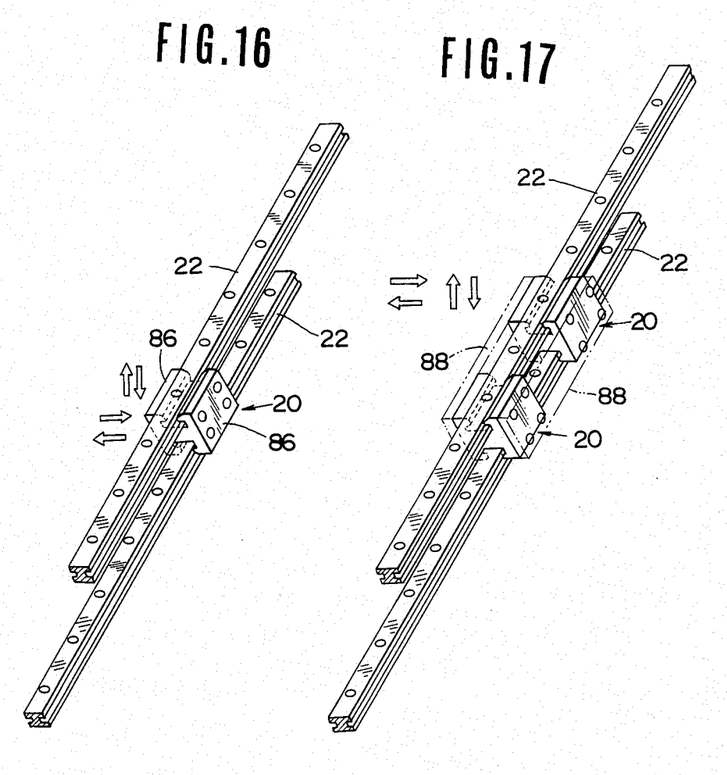
FIG. 16 is a perspective view explanatory of a mode of use of the linear bearing apparatus in accordance with the invention.
FIG. 17 is also a perspective view explanatory of another mode of use of the linear bearing apparatus in accordance with the invention.

The recirculating-ball linear bearing apparatus of FIGS. 1 to 15 admits of use in a variety of ways, as dictated by its applications. FIG. 16 illustrates its typical manner of use, suitable for transporting a relatively lightweight industrial robot or robot arm back and forth along a rectilinear path. The pair of guide rails 22 are fastened to any suitable support structure in vertically spaced, parallel relation to each other. Rollably mounted between the guide rails 22, the single linear bearing assembly 20 is constructed as set forth above in connection with FIGS. 1 to 15. Although not illustrated, the robot arm is understood to be affixed to either or both side faces 86 of the bearing assembly 20 for linear movement therewith along the guide rails 22.

As has been stated, the linear bearing apparatus of this invention is designed to bear equally well the load forces acting thereon in downward, upward, rightward, and leftward directions in its cross sectional plane. The eight groups of antifriction balls 32 individually function to bear the load forces against the guide rails 22, as discussed in more detail hereafter.

With reference to FIG. 3 the downward action is transmitted to the pair of guide rails 22 via the two uppermost groups of antifriction balls 32 and the two other groups of balls immediately below the web 50 of the bearing body 24. The upward load action is transmitted to the guide rails via the two lowermost balls groups and the two other ball groups just above the bearing body web. The rightward load action is transmitted to the guide rails via the four ball groups disposed just inwardly of the left hand bearing body flange 52. The leftward load action is transmitted to the guide rails via the four ball groups disposed just inwardly of the right hand bearing body flange. Essentially the apparatus can withstand load forces acting in any direction, not only in its cross sectional plane but in other planes.

FIG. 17 illustrates another mode of use of the apparatus, suitable for carrying a heavier load. This alternative usage calls for the tandem arrangement of two linear bearing assemblies 20 between the pair of guide rails 22. Each constructed as set forth above with reference to FIGS. 1 to 15, the two bearing assemblies 20 are rigidly interconnected by a pair of connector plates 88 fastened to their opposite side faces 86 for joint rolling motion along the guide rails 22. The bearing assemblies may be either in contact with or spaced from each other.

Figure 18:
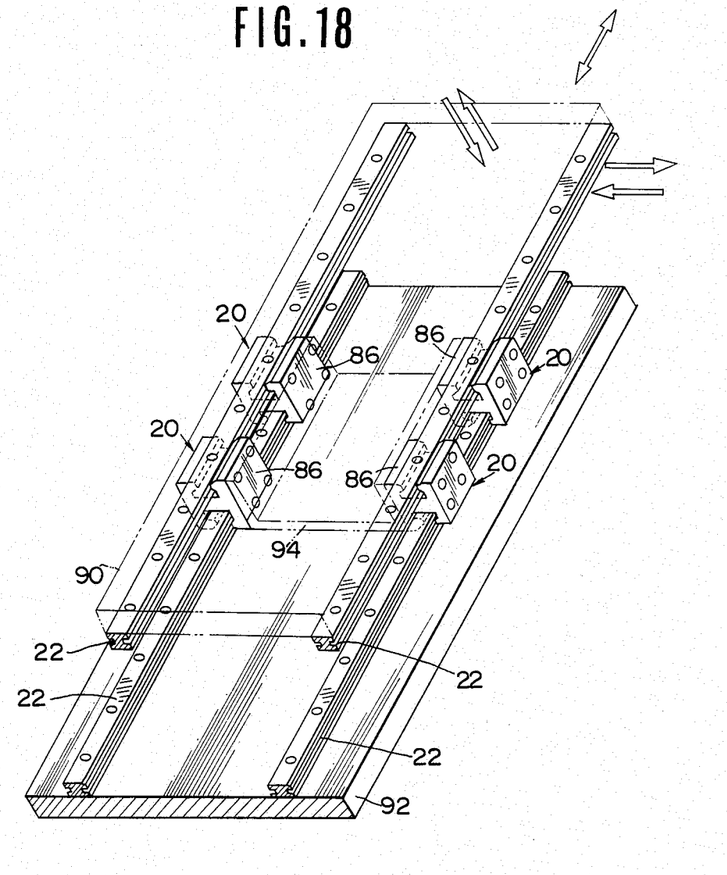
FIG. 18 is also a perspective view explanatory of still another mode of use of the linear bearing apparatus in accordance with the invention.

In FIG. 18 is shown the inventive apparatus as adapted for still more heavy-duty applications. The apparatus comprises two pairs of guide rails 22 in horizontally spaced, parallel relation to each other. Each pair of guide rails are vertically spaced from and parallel to each other. The two upper guide rails are screwed or otherwise fastened to a fixed support 90 whereas the lower ones are likewise fastened to another fixed support 92. Two linear bearing assemblies 20, each of the above described construction, are rollably mounted between each pair of guide rails 22. A connector plate 94 of U-shaped cross section are fastened to the opposed side faces 86 of the two pairs of bearing assemblies 20, thereby rigidly joining them together.

Thus the load on the apparatus is borne by the four bearing assemblies 20 each having eight groups of recirculating antifriction balls rollably engaged between its bearing body and one pair of guide rails 22. The apparatus can therefore positively support the load despite the varying directions of its action transmitted.

Modification

Figure 19:
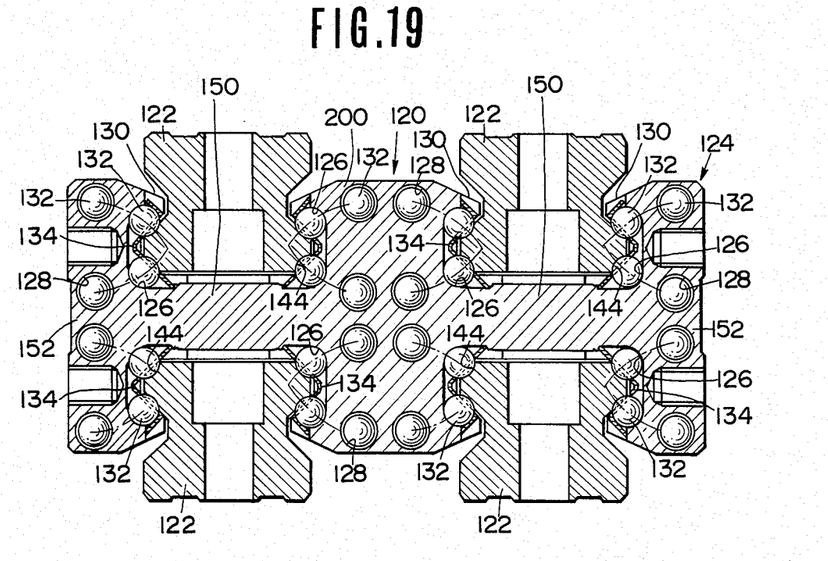
FIG. 19 is a cross section through modified recirculating-ball linear bearing apparatus embodying the principles of this invention.

FIG. 19 is a cross-sectional representation of dual recirculating-ball linear bearing apparatus built on the principles of the present invention for greater load-bearing capacity than that of the apparatus of FIGS. 1 to 15. The modified apparatus is a combination of two juxtaposed pairs of guide rails 122 and a recirculating-ball linear bearing assembly 120.

Each guide rail 122 can be of exactly the same construction as the guide rails 22 of the preceding embodiment which have been described with particular reference to FIG. 6. The arrangement of each pair of guide rails is also identical with that of the pair of guide rails of the FIGS. 1 to 15 embodiment. The modified apparatus features the juxtaposition of two such pairs of guide rails 122.

The linear bearing assembly 120 is modified to roll along the two pairs of guide rails 122 via sixteen groups of antifriction balls 132. For carrying these groups of balls the body 124 of the bearing assembly 120 is cross-sectionally shaped like two Hs joined side by side. More specifically the bearing body 124 comprises a pair of webs 150 disposed in line and each lying between one pair of guide rails 122, a middle flange 200 joining the proximal ends of the aligned webs and lying between the two pairs of guide rails, and a pair of side flanges 152 formed at the distal ends of the webs and lying on both sides of the two pairs of guide rails.

Formed longitudinally on the inner surfaces of the bearing body 124 are eight pairs of ball raceways 126 of arcuate cross section disposed opposite to the eight pairs of ball raceways 144 on the guide rails 122. The bearing body 124 also has ball return passageways 128 formed longitudinally therethrough in the vicinities of the respective ball raceways 126 thereon.

All the ball return passageways 128 are arranged in the middle 200 and side 152 flanges of the bearing body 124. While the side flanges 152 have each four ball return passageways formed therein in a single vertical row, the middle flange 200 has eight ball return passageways in two rows. The middle flange 200 is therefore made thicker than each side flange 152. Thus, essentially, the bearing body 124 may be considered a unitary combination of two bearing bodies each constructed as in the preceding embodiment.

The modified apparatus further comprises a pair of end covers, one seen at 130, each shaped like the cross section of the bearing body 124 and both fastened to its opposite ends. As in the foregoing embodiment the end covers are assumed to have hairpin grooves formed in their inside faces, each hairpin groove intercommunicating one ball raceway 126 on the bearing body and one adjacent ball return passageway 128 therein. The sixteen groups of antifriction balls 132 recirculate through the respective closed paths thus formed. Eight opposed pairs of Z-shaped cages 134 guide the balls 132 as they roll between the raceways 144 on the guide rails and the raceways 126 on the bearing body.

The other constructional and operational details of the modified apparatus can be as set forth above in conjunction with FIGS. 1 to 15. The advantages gained by the apparatus and the manners of use thereof are also considered self-evident from the foregoing.

It will of course be understood that various changes may be made in the form, details, arrangements, and proportions of the parts to conform to specific requirements of use or to design considerations or preferences, without departing from the scope of the invention as expressed in the following claims.

What is claimed is:

1. Recirculating-ball linear bearing apparatus capable of well withstanding the load acting thereon in any direction, comprising:
   (a) a pair of guide rails having heads and arranged in parallel spaced relation to each other, with their heads held opposite to each other, each guide rail having two pairs of parallel spaced raceways of arcuate cross section formed longitudinally on both sides of its head, each pair of raceways being angled away from each other;
   (b) a bearing body of substantially H-shaped cross section integrally comprising a web disposed between the pair of guide rails and a pair of side flanges on both sides of the guide rails, the bearing body having formed longitudinally on inner surfaces thereof four pairs of raceways of arcuate cross section arranged in opposed relation to the four pairs of raceways on the guide rails, the bearing body also having a return passageway extending longitudinally therethrough in the vicinity of each raceway thereon;
   (c) a pair of end covers secured to the opposite ends of the bearing body and each having formed therein a plurality of hairpin grooves each intercommunicating one raceway on the bearing body and one adjacent return passageway in the bearing body;
   (d) groups of antifriction balls rollably interposed between the raceways on the guide rails and the raceways on the bearing body, each group of antifriction balls being capable of recirculation through a closed path comprising one raceway on the bearing body, one adjacent return passageway in the bearing body, and two of the hairpin grooves in the end covers; and
   (e) cage means mounted in fixed relation to the bearing body for rollably holding the antifriction balls against displacement as they roll between the raceways on the guide rails and the raceways on the bearing body.

2. The recirculating-ball linear bearing apparatus as recited in claim 1, wherein the raceways on the guide rails and the raceways on the bearing body are, as viewed cross-sectionally, each curved with a radius approximately equal to the radius of each antifriction ball.

3. The recirculating-ball linear bearing apparatus as recited in claim 2, wherein the planes passing the median lines of the two pairs of raceways on each guide rail and the centers of the antifriction balls thereon are at angles of approximately 90 degrees to each other, and wherein the planes passing the median lines of each two pairs of raceways on the bearing body, opposed to the two pairs of raceways on one guide rail, and the centers of the antifriction balls thereon are also at angles of approximately 90 degrees to each other.

4. The recirculating-ball linear bearing apparatus as recited in claim 1, wherein the return passageways are formed in the pair of side flanges of the bearing body, and wherein two of the return passageways associated with each pair of raceways on the bearing body are disposed inwardly of the planes passing the median lines of the associated pair of raceways on the bearing body and the centers of the antifriction balls thereon.

5. The recirculating-ball linear bearing apparatus as recited in claim 1, wherein the cage means comprises four cages each extending along one pair of raceways on the bearing body, each cage being in the form of a strip of rigid material bent substantially into the shape of a V in cross section to provide a pair of divergent web portions, each web of each cage having formed therein a slot extending along one raceway on the bearing body, the slot having a width less than the diameter of each antifriction ball to allow the antifriction balls on one of the raceways on the bearing body to partly project therethrough into rolling engagement with one of the raceways on the guide rails.

6. The recirculating-ball linear bearing apparatus as recited in claim 5, wherein each cage has a flange formed at least along one side thereof for higher rigidity.

7. The recirculating-ball linear bearing apparatus as recited in claim 5, wherein each cage is mounted in position by having the opposite ends thereof closely engaged in retainer grooves formed in the pair of end covers.

8. The recirculating-ball linear bearing apparatus as recited in claim 5, wherein each cage has a pair of tongues formed at the opposite extremities of each slot therein for the smooth rolling motion of the antifriction balls from the corresponding one of the raceways on the bearing body to the associated hairpin grooves in the end covers.

9. Recirculating-ball linear bearing apparatus capable of well withstanding the load acting thereon in any direction, comprising:
   (a) two juxtaposed pairs of guide rails each having a head, each pair of guide rails being arranged in parallel spaced relation to each other and with their heads held opposite to each other, each guide rail having two pairs of parallel spaced raceways of arcuate cross section formed longitudinally on both sides of its head, each pair of raceways being angled away from each other;
   (b) a bearing body integrally comprising a pair of webs in line each disposed between one pair of guide rails, a middle flange joining the webs and disposed between the two pairs of guide rails, and a pair of side flanges formed at the opposite ends of the webs and disposed on both sides of the two pairs of guide rails, the bearing body having formed longitudinally thereon eight pairs of raceways of arcuate cross section arranged in opposed relation to the eight pairs of raceways on the guide rails, the bearing body also having a return passageway extending longitudinally therethrough in the vicinity of each raceway thereon;

(c) a pair of end covers secured to the opposite ends of the bearing body and adapted to intercommunicate each raceway on the bearing body and the adjacent one of the return passageways in the bearing body;

(d) groups of antifriction balls rollably interposed between the raceways on the guide rails and the raceways on the bearing body, each group of antifriction balls being capable of recirculation through a closed path comprising one raceway on the bearing body and one adjacent return passageway in the bearing body; and (e) cage means mounted in fixed relation to the bearing body for rollably holding the antifriction balls against displacement as they roll between the raceways on the guide rails and the raceways on the bearing body.

10. The recirculating-ball linear bearing apparatus as recited in claim 9, wherein the middle flange of the bearing body is thicker than each side flange thereof, and wherein the return passageways are all formed in the middle and side flanges of the bearing body.

11. Recirculating-ball linear bearing apparatus capable of well withstanding the load acting thereon in any direction, comprising:

(a) a first support;

(b) a second support arranged in parallel spaced relation to the first support;

(c) two juxtaposed pairs of guide rails each having a head, each pair of guide rails being arranged in parallel spaced relation to each other and with their heads held opposite to each other, one of each pair of guide rails being fixedly attached to the first support, the other of each pair of guide rails being fixedly attached to the second support, each guide rail having two pairs of parallel spaced raceways of arcuate cross-section formed longitudinally on both sides of its head, each pair of raceways being angled away from each other;

(d) a pair of bearing bodies of substantially H-shaped cross-section each comprising a web disposed between each pair of guide rails and a pair of side flanges on both sides of the associated guide rails; each bearing body having formed longitudinally on inner surfaces thereof four pairs of raceways of arcuate crosssection arranged in opposed relation to the four pairs of raceways on the associated guide rails, each bearing body also having a return passageway extending longitudinally therethrough in the vicinity of each raceway thereon;

(e) two pair of end covers secured to the opposite ends of the respective bearing bodies and each having formed therein a plurality of hairpin grooves each intercommunicating one raceway on the associated bearing body and one adjacent return passageway in the associated bearing body;

(f) groups of antifriction balls rollably interposed between the raceways on the guide rails and the raceways on the respective bearing bodies, each group of antifriction balls being capable of recirculation through a closed path comprising one raceway on the associated bearing body, one adjacent return passageway in the associated bearing body, and two of the hairpin grooves in the end covers; and (g) two pair of cage means mounted in fixed relation to the respective bearing bodies for rollably holding the antifriction balls against displacement as they roll between the raceways on the guide rails and the raceways on the bearing bodies.

* * * * *